3,244,591
SOLUTIONS OF ADRENOCHROME MONOSEMI-CARBAZONE IN 7-DIMETHYLAMINOETHYL-1,3-DIMETHYL XANTHINE

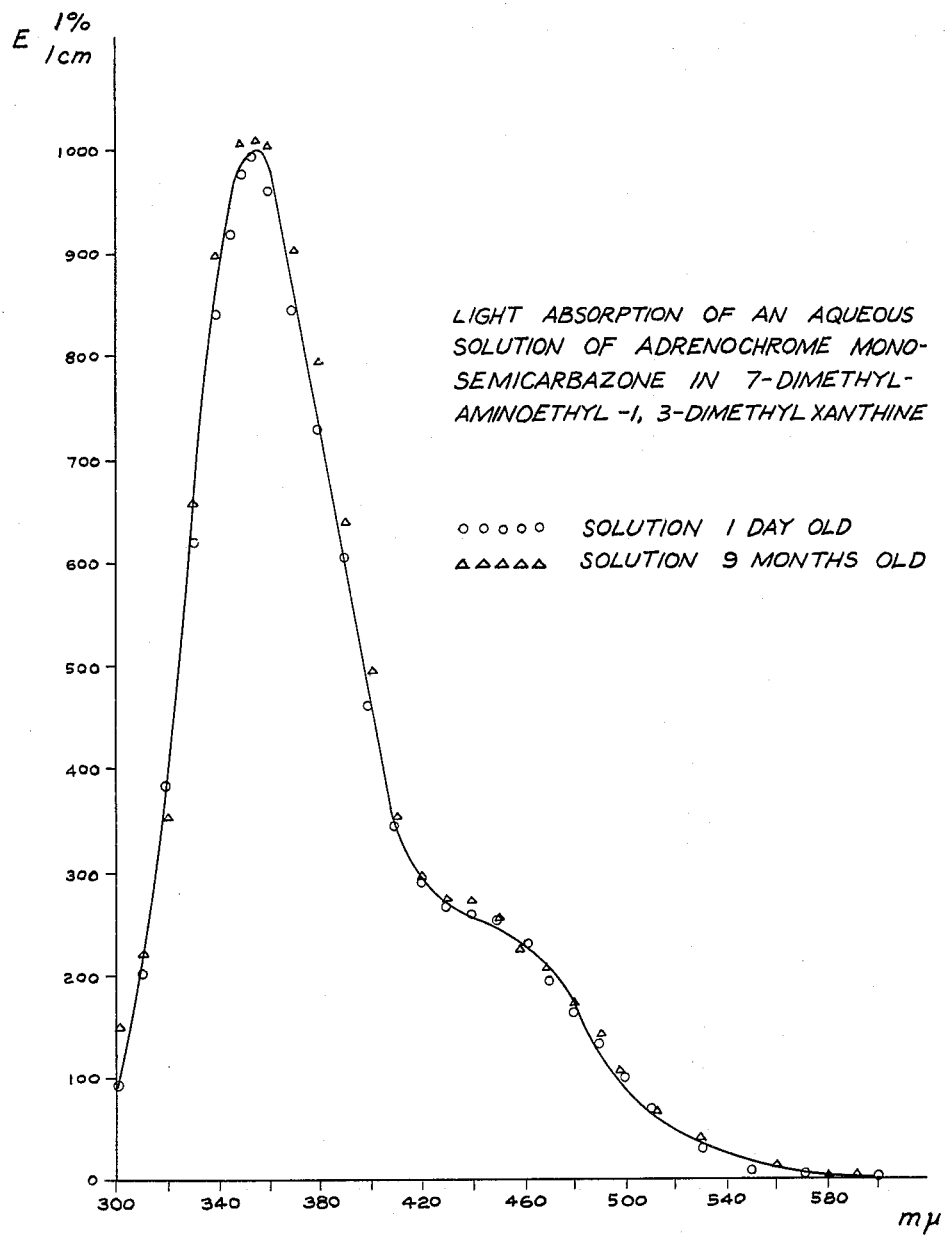

Karl Schoen, Kew Gardens, N.Y., assignor to Endo Laboratories Inc., Richmond Hill, N.Y., a corporation of New York
Filed Aug. 10, 1960, Ser. No. 48,684
8 Claims. (Cl. 167—65)

This invention relates to adrenochrome monosemicarbazone. In particular, it is directed to stable solutions thereof containing the substance in high concentration. Adrenochrome, an oxidation product of adrenalin, is used in the form of its stable monosemicarbazone derivative for the control of capillary bleeding caused by increased capillary permeability. It is of value in stopping bleeding associated with idiopathic purpura, retinal hemorrhage, familial telangiectasia, epistaxis, hemoptysis, and hematuria and is also claimed to be useful in controlling postpartum hemorrhage and postoperative bleeding associated with tonsillectomy, adenoidectomy, and other surgical procedures.

The preparation of adrenochrome monosemicarbazone is described in U.S. Patent 2,506,294. The substance is only very slightly soluble in water and in order to apply the usual therapeutic dose of 5 mg. intramuscularly or orally one has made use of solubilizing agents. Fleischhacker and Barsel (U.S. Patent 2,581,850) describe a complex of adrenochrome monosemicarbazone with sodium salicylate in the proportion of 1:25 which is soluble in water and suitable for parenteral and oral application. The disadvantage of this preparation lies in the high concentration of 13% solids necessary to give a solution containing 5 mg. of adrenochrome monosemicarbazone in 1 ml. of liquid. This very frequently causes pain on intramuscular injection and the high dose of sodium salicylate may cause toxic side reactions in sensitive persons.

I have now found that 7-dimethylaminoethyl-1,3-dimethylxanthine is a selective solubilizing agent for adrenochrome monosemicarbazone.

This compound has the great advantage over sodium salicylate in that much less of it is required to solubilize the adrenochrome monosemicarbazone. Thus, a 7.5% solution of 7-dimethylamino-ethyl-1,3-dimethylxanthine in water gives a stable solution of 5 mg. adrenochrome monosemicarbazone per 1 ml. which corresponds to a proportion of 1 part adrenochrome monosemicarbazone to 15 parts of solubilizing agent. Since 7-dimethylaminoethyl-1,3-dimethylxanthine is a basic compound, its solution is preferably neutralized to a suitable or physiologically acceptable pH such as 7.0 with a non-toxic, i.e., a suitable or physiologically acceptable acid, e.g., hydrochloric, sulfuric, citric or other well-known acids. Such solutions are well tolerated by the tissues on intramuscular or parenteral injection and are practically painless.

A study of a number of water soluble pyrimidine and xanthine derivatives has shown that this solubilization effect on andrenochrome is shared to a certain extent by these compounds.

In the following table, I set forth the relation of concentration of solubilizing agent to the maximum amount of adrenochrome monosemicarbazone held in solution at 21° C.; with the exception of 7-dimethylaminoethyl-1,3-dimethylxanthine and caffeine hydroxymethylate these are the saturation concentrations of the compounds tested.

TABLE I

| Compound | Concentration, percent | pH of solution | Adrenochrome monosemicarbazone, mg./ml. |
|---|---|---|---|
| 7-dimethlaminoethyl-1,3-dimethylxanthine | 7.5 | 7.0 | 5 |
| 1,3-dimethyluracil | 10 | 6.0 | 2.4 |
| 1,3,5-trimethyluracil | 7 | 6.0 | 2.8 |
| 1,3,5-trimethyl-2,4-dihydro-uracil | 10 | 3.5 | 0.6 |
| Na 1,3-dimethyluracil-5-carboxylate | 8.7 | 7.4 | 2.2 |
| Na salt of guanylic acid | 4.2 | 8.2 | 0.7 |
| Caffeine hydroxymethylate | 10 | 7.4 | 1.6 |
| Do | 5 | 7.2 | 0.8 |

This table shows that the solubilization effect of 7-dimethylaminoethyl - 1,3 - dimethylxanthine is much superior to that of all other compounds tested.

The aforementioned solution of 5 mg./ml. adrenochrome monosemicarbazone in 7.5% 7-dimethylaminoethyl-1,3-dimethylxanthine can be diluted at any desired rate with water, sugar syrup, glycerol or other pharmaceutically acceptable vehicles or mixtures of vehicles to give a stable pleasant tasting solution for oral use.

7-dimethylaminoethyl - 1,3 - dimethylxanthine is of a low order of toxicity as has been shown by R. C. Batterman et al. [Am. J. Med. Sci. 236, 162 (1958)]. These investigators have given 100 to 400 mg. doses three to four times a day to human adults without observing any untoward effect.

The solutions of my invention are stable, and no sign of physical or chemical instability has been observed during tests conducted at 37° for three months and at room temperature for nine months.

In the accompanying drawing, the graph shows the ultraviolet absorption spectrum of a solution prepared freshly according to Example 2 and of the same solution after nine months standing at room temperature. The two spectra are essentially identical, thus showing the stability of adrenochrome monosemicarbazone in the solution. The ultraviolet maximum at 355 mu is characteristic for adrenochrome monosemicarbazone. 7-dimethylaminoethyl-1,3-dimethylxanthine does not show selective absorption in the spectral region studied.

Example 1

To a solution of 7.5 gm. of 7-dimethylaminoethyl-1,3-dimethylxanthine in 80 ml. of water, 5 N HCl was added dropwise until the pH of the solution was 7.0. Water was added to give a volume of 100 ml. To this solution was added 500 mg. adrenochrome monosemicarbazone and the mixture stirred until a clear solution was obtained. Part of this solution was filtered aseptically and filled into 1 ml. ampules. The remainder was filled into 15 ml. bottles and stored at 37° for three months and at room temperature for nine months. At the end of these periods, all solutions were crystal clear and no physical change was observed.

Example 2

A solution of 7.5 gm. of 7-dimethylaminoethyl-1,3-dimethylxanthine, 180 mg. methylparaben USP and 20 mg. propylparaben USP in 80 ml. water was prepared by stirring the ingredients at about 50° until dissolved. After cooling to room temperature, 5 N HCl was added dropwise until the pH of the solution was 7.0. Water was added to give a volume of 100 ml. To this solution was added 500 mg. adrenochrome monosemicarbazone and the mixture stirred until a clear solution was obtained. Part of this solution was filtered aseptically and filled into 1 ml. ampules. The remainder was filled into 15 ml.

bottles and stored at 37° for three months and at room temperature for nine months. At the end of these periods, all solutions were crystal clear and no physical change was observed.

Example 3

One hundred ml. of a solution prepared according to Example 2 were mixed with 50 ml. of glycerol, 150 ml. of Sorbo (a 70% sorbitol solution), 1 gm. of saccharin sodium, 1 gm. of sodium cyclamate, 5 ml. of chocolate cream flavor, 900 mg. of methylparaben, 100 mg. of propylparaben, and enough water to give a total volume of 500 ml.

A palatable solution resulted containing 1 mg. adrenochrome monosemicarbazone per 1 ml., suitable for oral use. The solution was stable and no precipate or other sign of deterioration was observed when standing at room temperature for nine months.

In accordance with this invention, aqueous solutions of adrenochrome monosemicarbazone in higher concentration than can be obtained in water alone comprise aqueous solutions of 7-dimethylaminoethyl-1,3-dimethyl xanthine in a concentration ranging from 1% to saturation, which may be buffered to a physiological pH, including adrenochrome monosemicarbazone in a concentration range exceeding its solubility in water up to saturation concentration.

It will be understood that the foregoing description of the invention and the examples are merely illustrative of the principles thereof. Accordingly, the appended claims are to be construed as defining the invention within the full spirit and scope thereof.

I claim:

1. A composition comprising an aqueous solution of adrenochrome monosemicarbazone and 7-dimethylaminoethyl-1,3-dimethyl xanthine, wherein the concentration of the adrenochrome monosemicarbazone is higher than its solubility in water.

2. A solution comprising an aqueous solution of 7-dimethylaminoethyl-1,3-dimethyl xanthine in a concentration ranging from 1% to saturation, buffered to a physiological pH, including adrenochrome monosemicarbazone in a concentration range exceeding its solubility in water up to saturation concentration.

3. A solution suitable for parenteral administration comprising an aqueous solution of 7-dimethylaminoethyl-1,3-dimethyl xanthine and in a concentration of about 7.5%, a non-toxic acid to give a neutral reaction, and adrenochrome monosemicarbazone in a concentration of about 5 milligrams per milliliter.

4. A solution in accordance with claim 3 including a lower alkyl ester of para-hydroxy benzoic acid.

5. A solution in accordance with claim 4 wherein the lower alkyl ester is the methyl ester.

6. A solution for oral use in accordance with claim 1 including a lower alkyl ester of para-hydroxy benzoic acid, a polyhydric alcohol, ethanol and flavoring agents.

7. A solution in accordance with claim 6 wherein the polyhydric alcohol is a member of the group consisting of propylene glycol, glycerol, sorbitol, mannitol, dulcitol and mixtures thereof.

8. A solution in accordance with claim 4, wherein the lower alkyl ester is the propyl ester.

References Cited by the Examiner

UNITED STATES PATENTS 2,791,532   5/1957   Fleischhacker _____ 167—65

FOREIGN PATENTS 806,908   1/1959   Great Britain.

OTHER REFERENCES

Batterman: Amer. J. Med. Sci., vol. 236, 1958, p. 162.

JULIAN S. LEVITT, *Primary Examiner.*

MORRIS O. WOLK, LEWIS GOTTS, *Examiners.*